(12) United States Patent
Herrmann et al.

(10) Patent No.: US 9,931,786 B2
(45) Date of Patent: Apr. 3, 2018

(54) METHOD FOR PRODUCING A TRANSVERSE SEALING SEAM AND TRANSVERSE SEALING DEVICE

(75) Inventors: Thomas Herrmann, Karlsruhe (DE); Franz Bobschek-Born, Karlsruhe (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 809 days.

(21) Appl. No.: 13/982,554

(22) PCT Filed: Feb. 9, 2012

(86) PCT No.: PCT/EP2012/052217
§ 371 (c)(1),
(2), (4) Date: Jul. 30, 2013

(87) PCT Pub. No.: WO2012/107522
PCT Pub. Date: Aug. 16, 2012

(65) Prior Publication Data
US 2013/0306219 A1    Nov. 21, 2013

(30) Foreign Application Priority Data
Feb. 11, 2011   (DE) ........................ 10 2011 004 002

(51) Int. Cl.
*B32B 37/00*   (2006.01)
*B29C 65/08*   (2006.01)
(Continued)

(52) U.S. Cl.
CPC .......... *B29C 65/08* (2013.01); *B29C 66/1122* (2013.01); *B29C 66/4312* (2013.01);
(Continued)

(58) Field of Classification Search
CPC ... B29C 65/08; B29C 65/088; B29C 66/4312; B29C 66/81431; B29C 66/81469;
(Continued)

(56) References Cited

U.S. PATENT DOCUMENTS 4,241,560 A    12/1980   Deimel et al.
4,444,614 A    4/1984    Krayer
(Continued)

FOREIGN PATENT DOCUMENTS

DE    28 12 138 C2    9/1979
DE    32 36 164       5/1983
(Continued)

OTHER PUBLICATIONS

European Patent Office, Application No. 12 704 048.3, Examiner's Action, Oct. 3, 2017.

*Primary Examiner* — James D Sells
(74) *Attorney, Agent, or Firm* — Paul & Paul

(57) ABSTRACT

The invention relates to a method for producing a transverse sealing seam in a tubular bag (6) having a longitudinal sealing seam (5), wherein the tubular bag (6) is passed through between a sonotrode (1) and an anvil (2) and, in order to produce the transverse sealing seam, the sonotrode (1) and the anvil (2) are moved toward each other so that a welding force is applied to the tubular bag (6). In order to provide a method and transverse sealing device with which the stated disadvantages can be overcome at least reduced, the longitudinal sealing seam (5) is moved through a gap (8, 7') formed in the sonotrode (1) or the counter tool (2) at least during the application of the welding force.

20 Claims, 7 Drawing Sheets

(51) Int. Cl.
  *B29C 65/00* (2006.01)
  *B65B 51/22* (2006.01)
  *B65B 51/30* (2006.01)
(52) U.S. Cl.
  CPC .. *B29C 66/81431* (2013.01); *B29C 66/81469* (2013.01); *B29C 66/836* (2013.01); *B29C 66/8322* (2013.01); *B29C 66/849* (2013.01); *B65B 51/225* (2013.01); *B65B 51/303* (2013.01); *B29C 66/112* (2013.01); *B29C 66/133* (2013.01); *B29C 66/135* (2013.01); *B29C 66/346* (2013.01); *B29C 66/3452* (2013.01); *B29C 66/4322* (2013.01)
(58) Field of Classification Search
  CPC ............ B29C 66/8322; B29C 66/8491; B65B 51/225; B65B 51/303
  USPC .................................. 156/73.1, 580.1, 580.2
  See application file for complete search history.

(56) References Cited

U.S. PATENT DOCUMENTS

| | | | | |
|---|---|---|---|---|
| 4,865,687 | A * | 9/1989 | Pierson | B29C 65/08 156/293 |
| 4,993,555 | A | 2/1991 | Hemm | |
| 5,924,267 | A | 7/1999 | Bomer et al. | |
| 6,780,264 | B2 * | 8/2004 | Nakata | B29C 65/04 156/359 |
| 8,216,408 | B2 * | 7/2012 | Vogler | B29C 66/133 156/580.2 |
| 2003/0051442 | A1 | 3/2003 | Post et al. | |
| 2003/0221790 | A1 * | 12/2003 | Cosaro | B29C 53/50 156/580.1 |
| 2004/0031554 | A1 | 2/2004 | Moglich | |
| 2004/0048176 | A1 * | 3/2004 | Darcy, III | B29C 53/387 430/56 |
| 2007/0137019 | A1 * | 6/2007 | Williamson | B21D 51/26 29/525 |
| 2008/0128471 | A1 * | 6/2008 | Eberbach | B23K 20/106 228/1.1 |
| 2009/0133803 | A1 * | 5/2009 | Lehto | A61F 13/15707 156/73.1 |
| 2012/0012258 | A1 | 1/2012 | Vogler | |

FOREIGN PATENT DOCUMENTS

| | | |
|---|---|---|
| DE | 37 35 168 A1 | 5/1989 |
| DE | 38 29 042 A1 | 3/1990 |
| DE | 195 00 971 C2 | 7/1996 |
| DE | 102 14 405 A1 | 10/2003 |
| DE | 600 15 280 T2 | 2/2006 |
| DE | 10 2007 022 854 A1 | 11/2008 |
| DE | 10 2007 056 737 A1 | 5/2009 |
| DE | 10 2007 060 442 A1 | 6/2009 |
| DE | 10 2009 026 925 A1 | 12/2010 |
| DE | 10 2009 043 143 A1 | 12/2010 |
| EP | 1100658 B1 | 1/2003 |
| EP | 1 354 693 A2 | 10/2003 |
| EP | 1 468 914 A1 | 10/2004 |
| FR | 2 953 200 A1 | 6/2011 |
| WO | 9609932 | 4/1996 |
| WO | 2011 104168 A1 | 9/2011 |

* cited by examiner

METHOD FOR PRODUCING A TRANSVERSE SEALING SEAM AND TRANSVERSE SEALING DEVICE

The present invention relates to a method for producing a transverse sealing seam and to a transverse sealing device using ultrasound.

When sealing transversely, at least two materials lying one on another are sealed to one another transversely, i.e. perpendicularly, to the direction of movement of the materials.

In vertical tubular bag packaging machines for example, a tube is formed from a strip of material and the two side edges of the strip of material are joined to one another with a longitudinal sealing seam. The tube is then divided into a number of closed tubular bags with the aid of transverse sealing seams.

For this it is necessary for the tubular bag already closed with the aid of a longitudinal sealing seam to be sealed by the welding force applied by the sonotrode through the tubular bag on the counter tool or anvil. Due to the presence of the longitudinal sealing seam, the number of layers of the strip of material arranged between the sonotrode on the one hand and the anvil on the other is not constant along the width of the welding area.

As shown diagrammatically in FIG. 1, the result is usually a 2-4-2 layer construction, i.e. whereas only two layers of the strip of material are lying on one another in the outer regions of the tubular bag to be sealed transversely, four layers of the strip of material are lying on one another in the region of the longitudinal sealing seam. This means that at the location at which the longitudinal seam is folded over, twice as many layers of the strip of material are present than in the remainder of the welding area. As the sonotrode is pressed onto the anvil with a constant force, this leads to a high specific contact pressure in the relatively small area of the longitudinal sealing seam. Consequently, premature melting occurs in this 4-layer region, leading in turn to undesired overwelding of the plastic. This can cause defects, leakage and undefined melt flow which in the most favourable case only has negative visual effects on the transverse sealing seam. In addition, leaks can occur in the 2-layer region as a large part of the available energy is applied in the 4-layer region.

For completeness it should be pointed out that there are also other forms of longitudinal sealing seam. For example it is also possible for a 2-3-2 layer construction to be produced. In principle the problems described also occur with such a seam as well.

At present three different methods are used to produce a transverse sealing seam.

Firstly, it is possible to simply overweld the longitudinal sealing seam. This has the advantage that neither the anvil nor the sonotrode have to be adapted to the longitudinal sealing seam. However the disadvantages already named still apply so this method can only be used without problems for specific types of film.

Consequently, as an alternative, a method has already been used in which the sonotrode or the anvil has a recess in the region of the longitudinal sealing seam, i.e. in the region in which the number of layers is 4 for example. Consequently, during the welding operation, the longitudinal seam lying on the tubular bag is guided in the region of the recess. This makes it possible to eliminate the increased specific contact pressure and the relatively high use of energy in the 4-layer region.

However, this method has the disadvantage that the sonotrode or the anvil has to be specifically adapted, i.e. both the thickness of the strip of material and the width of the longitudinal sealing seam must be known and the corresponding sonotrode or anvil can then only be used for materials with the same thickness and the same width of longitudinal sealing seam. If for example the width of the longitudinal sealing seam is changed, this welding device can no longer be used and instead a new sonotrode or a new anvil with the corresponding recess must be produced.

As the longitudinal sealing seam is guided through the recess "lying flat", the recess must have a width which corresponds to the width of the longitudinal sealing seam. However, the recess leads to poorer transverse welding over the width of the longitudinal sealing seam, which again causes leaks with some materials.

Moreover, when in operation it is not always possible to guarantee that the longitudinal sealing seam runs in exactly the same position. So if there is a tiny error, i.e. misalignment between the longitudinal sealing seam and the recess provided, this has negative effects on the sealing of the seam.

A third method makes use of a multi-layer sealing seam. This means that here, first of all a transverse seam is sealed which may only extend roughly over the longitudinal sealing seam or not at all. Then a second seam runs completely across the bag and so provides the sealing. Optionally a third sealing seam can be added which is not continuous. As a rule one sealing seam is sufficient to guarantee adequate sealing. However, frequently a plurality of transverse seams are needed to make sure that the sealed tubular bag does not open on its own or when a minimal opening force is applied.

This method has the advantage that the forces in action are distributed better. However here as well the method is costly and the format inflexible, i.e. components must be changed in the event of a change in the thickness of the strip of material and/or the width of the longitudinal sealing seam. In addition, the problem when transversely sealing the second seam described initially still remains.

Departing from the prior art as described, the underlying object of the present invention is therefore to provide a method and a transverse sealing device with which the named disadvantages can be overcome or at least reduced.

With regard to the method, this object is achieved in that at least during the application of the welding force the longitudinal sealing seam is moved through a gap formed in the sonotrode or the counter tool or anvil. In one preferred form of embodiment the gap has a width of between 0.05 and 0.3 mm, preferably of between 0.07 and 0.2 mm, best of all of between 0.9 and 0.15 mm.

Thus, according to the invention, the longitudinal sealing seam is not moved between the sonotrode and the counter tool or anvil lying flat but moved through the gap "erect", i.e. the longitudinal sealing seam is arranged with its seam width perpendicular to the tubular bag. Or in other words, the area formed by the longitudinal sealing seam stands roughly perpendicular to the surface of the tubular bag. Therefore, in one preferred form of embodiment provision is made for the depth of the gap to be greater than the width of the gap.

This means that no welding force is applied to the longitudinal sealing seam. As the longitudinal sealing seam is moved through between the sonotrode and the counter tool or anvil while "erect" and not lying flat, the region in which no welding takes place between the sonotrode and the counter tool or anvil is very small so leakage problems can be discounted. The flow of melt that takes place is sufficient to produce fully sealed seams.

In another particularly preferred form of embodiment provision is made for a two-part sonotrode or a two-part counter tool or anvil to be used in which the distance between the two parts of the sonotrode or counter tool is adjusted according to the thickness of the longitudinal sealing seam.

This ensures that the sonotrode or the counter tool or anvil can be matched to the longitudinal sealing seam. If for example a tubular bag is produced in a very thin material, the distance between the two parts which form the gap can be reduced. It would also be conceivable to briefly reduce the size of the gap at the moment at which the transverse sealing is carried out in order to allow optimum welding. Before and after the welding operation the gap can then be enlarged again to ensure that the longitudinal sealing seam can slip through the gap as far as possible unhindered as the strip advances.

With regard to the device, the object named initially is achieved through a transverse sealing device with a sonotrode and a counter tool or anvil in which the sonotrode or counter tool exhibits a gap. This gap is provided so that the longitudinal sealing seam can be accommodated standing "erect", i.e. roughly perpendicular to the strip of material being sealed, so it is not intended that the longitudinal sealing seam be sealed again. At the same time the object is to make sure that the transverse sealing seam can be produced with the minimum possible interruption due to the longitudinal sealing seam. Therefore the gap extends roughly perpendicular to the sealing faces provided by the sonotrode and the counter tool.

In one preferred form of embodiment the sonotrode or the counter tool has a plurality of gaps of different thickness. This allows the same tool or the same sonotrode to be used for different thicknesses of material. If a tubular bag of greater material thickness is to be sealed, the counter tool or anvil and/or the sonotrode can be positioned in such a way that another gap exhibiting a greater gap thickness is available to receive the longitudinal sealing seam. However, as each gap in the sonotrode or the counter tool or anvil entails a reduction in the welding force in the corresponding position and hence the risk of an inferior quality sealing seam, in one particularly preferred form of embodiment provision is made for the thickness of the gap to be adjustable. Here, for example the sonotrode or the counter tool can be made in two parts so that the gap is formed between the two parts, and one of the parts can be moveable relative to the other so that the width of the gap can be adjusted.

Further advantages, features and possible applications will become clear from the following description of two forms of embodiment and the associated figures in which.

Figure 1:
FIG. 1 shows a diagrammatic illustration of the number of layers.
Figure 2:
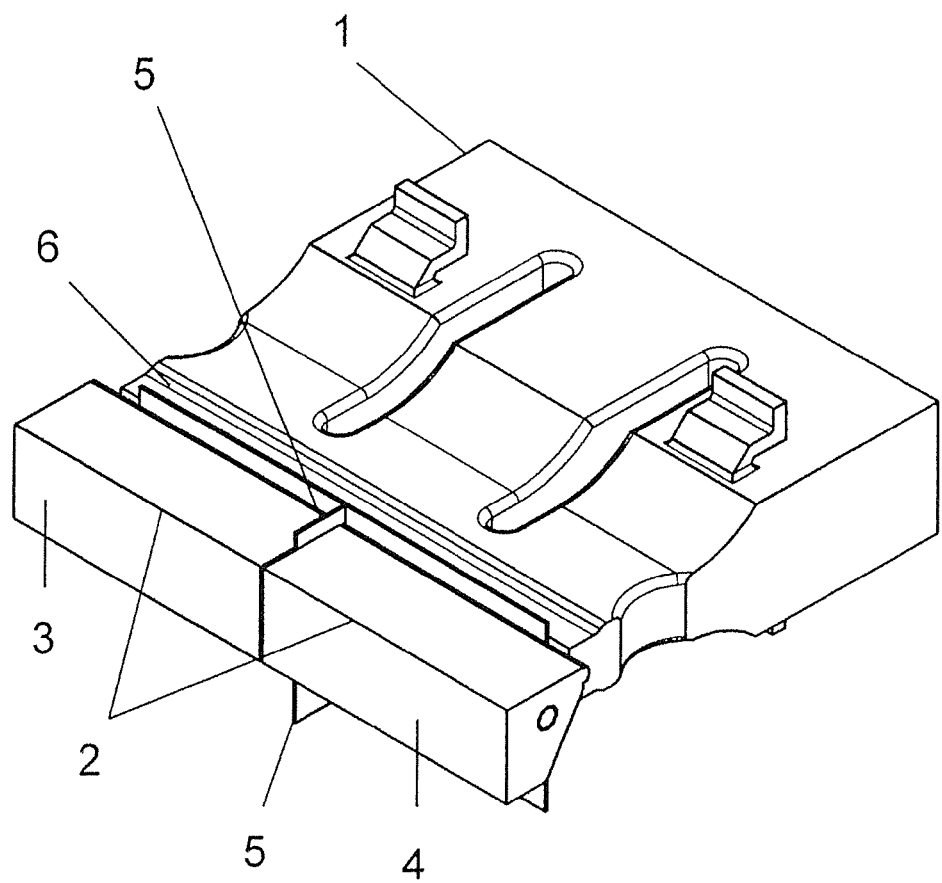
FIG. 2 shows a perspective view of a first form of embodiment of the invention.

FIG. 2 shows a first form of embodiment of the invention. The transverse sealing device shown consists of a sonotrode 1 and an anvil 2 which comprises two parts 3, 4. A tubular bag 6 already provided with a longitudinal sealing seam 5 is arranged between the sonotrode 1 and the anvil 2 in such a way that the section that is already sealed, i.e. the longitudinal sealing seam 5, is guided into the gap between the two parts 3, 4 of the anvil 2 while the as yet unsealed part of the tubular bag 6 is guided between the sealing face of the sonotrode 1 and the counter tool or anvil 2.

Figure 3:
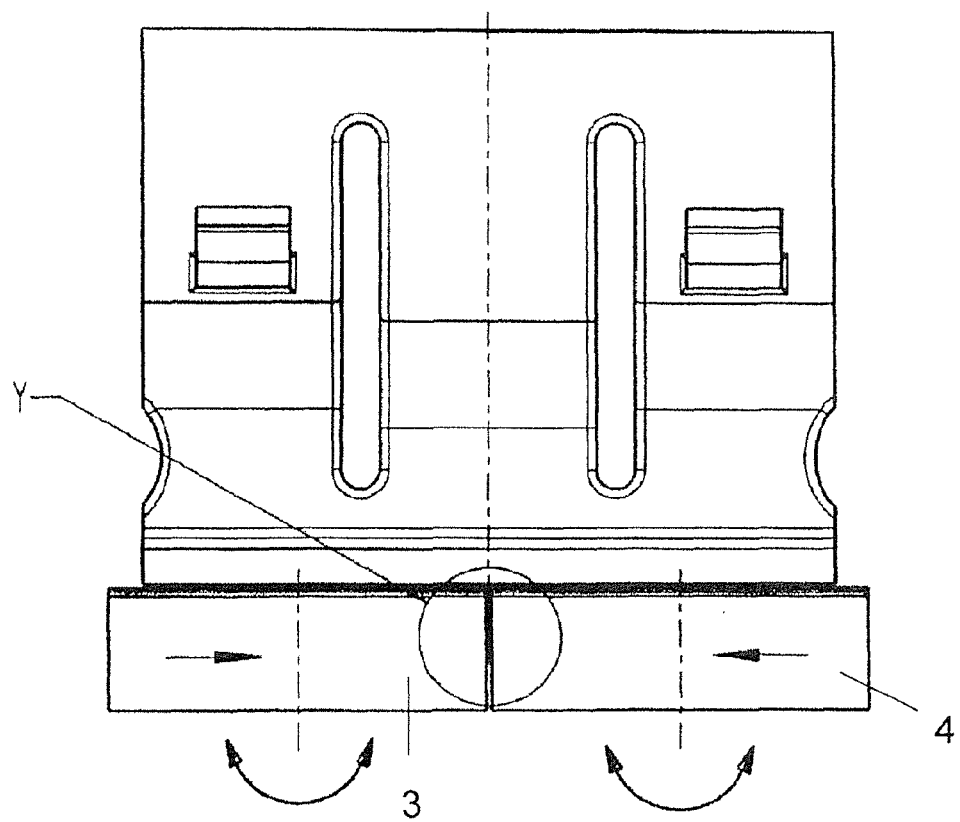
FIG. 3 shows a plan view of the form of embodiment of FIG. 2.

As indicated by means of the arrows in FIG. 3, which shows a plan view of the form of embodiment of FIG. 2, the two parts 3, 4 of the counter tool or anvil 2 can be moved relative to one another. This allows firstly matching of the gap 7 to the thickness of the longitudinal sealing seam and secondly safer introduction of the longitudinal sealing seam 5 into the gap 7 at the beginning of the welding operation. The width of the gap 7 must be chosen so that the longitudinal sealing seam 5 can be guided through the gap without any hindrance and without the longitudinal sealing seam being damaged. On the other hand the gap must be as small as possible so that the region in which the gap 7 interrupts transverse sealing between the counter tool or anvil 2 and the sonotrode 1 is as small as possible.

In practice it has been found that this gap is advantageously between 0.1 and 0.2 mm.

Figure 4:
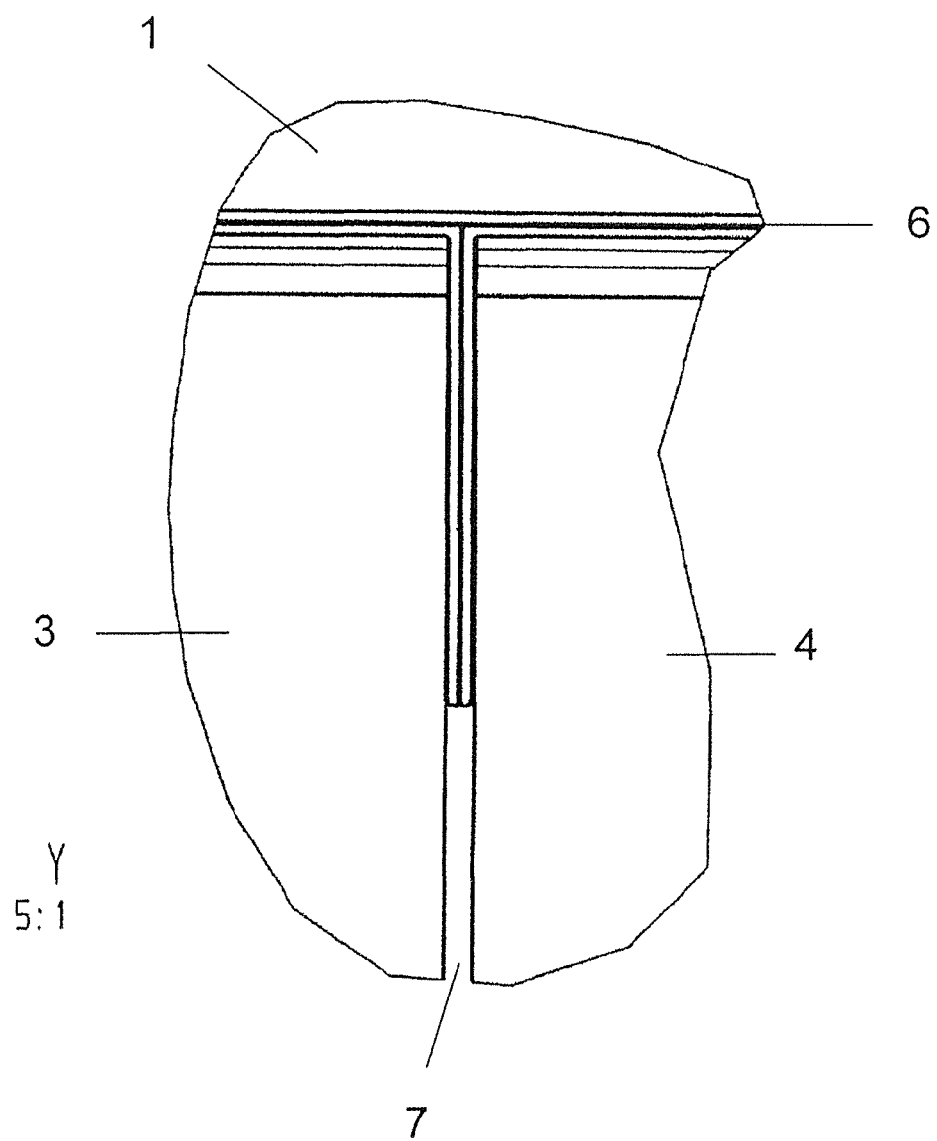
FIG. 4 shows an enlarged detail from FIG. 3.

FIG. 4 shows an enlarged detail Y of the corresponding region of FIG. 3. The path of the tubular bag 6 between the sonotrode 1 and the two parts 3, 4 of the counter tool or anvil 2 is visible. It can also be seen that the longitudinal sealing seam 5 is guided essentially perpendicular, i.e. erect, to the gap between the counter tool or anvil 2 and the sonotrode 1 in which the transverse sealing takes place.

Figure 5:
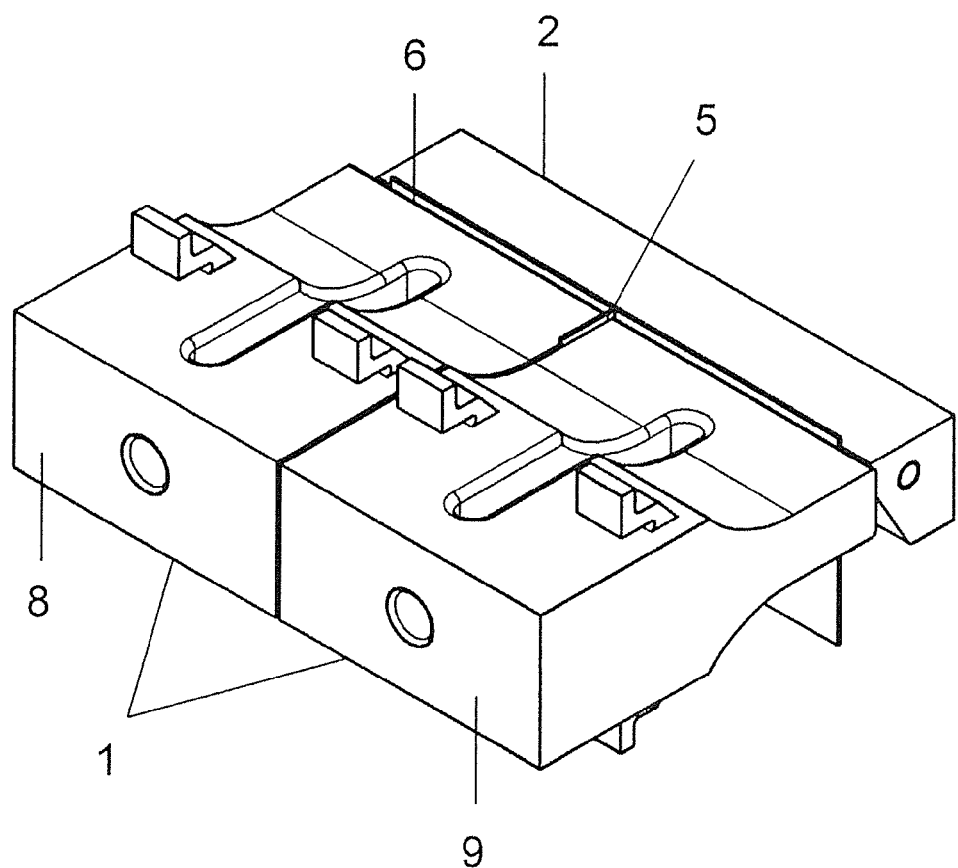
FIG. 5 shows a perspective view of a second form of embodiment of the invention.
Figure 6:
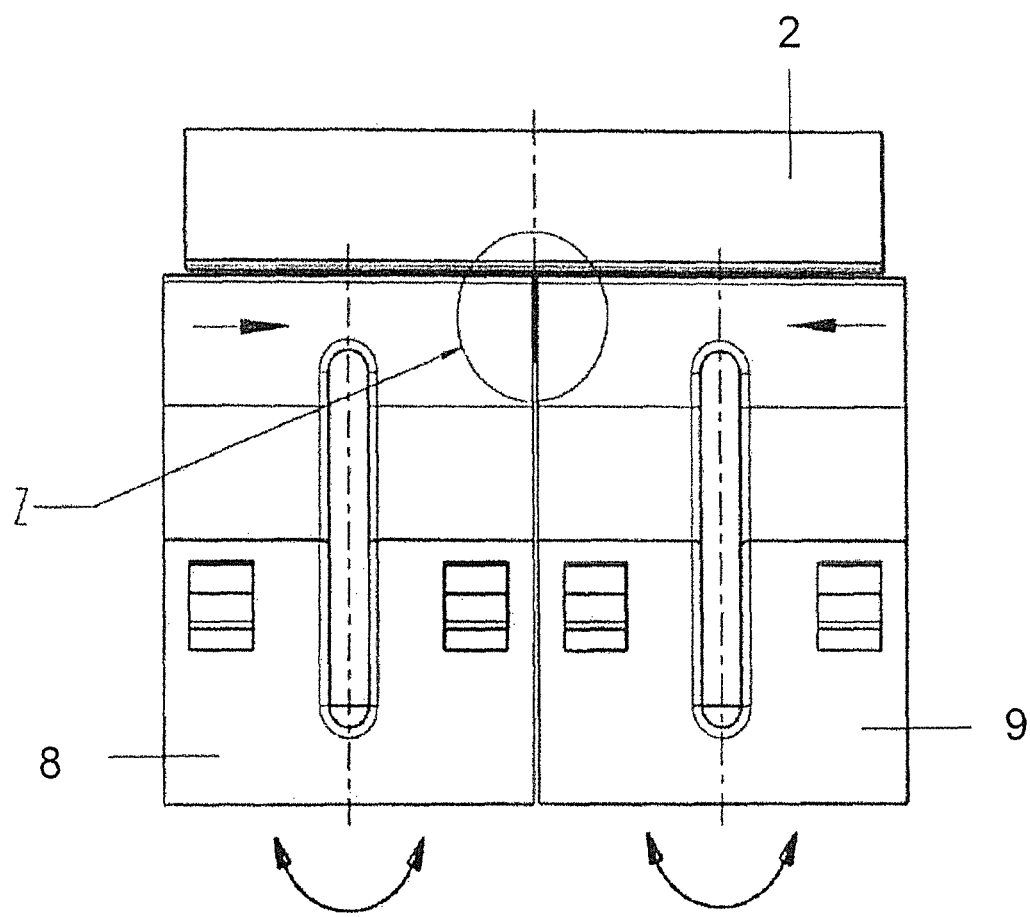
FIG. 6 shows a plan view of the form of embodiment of FIG. 5.
Figure 7:
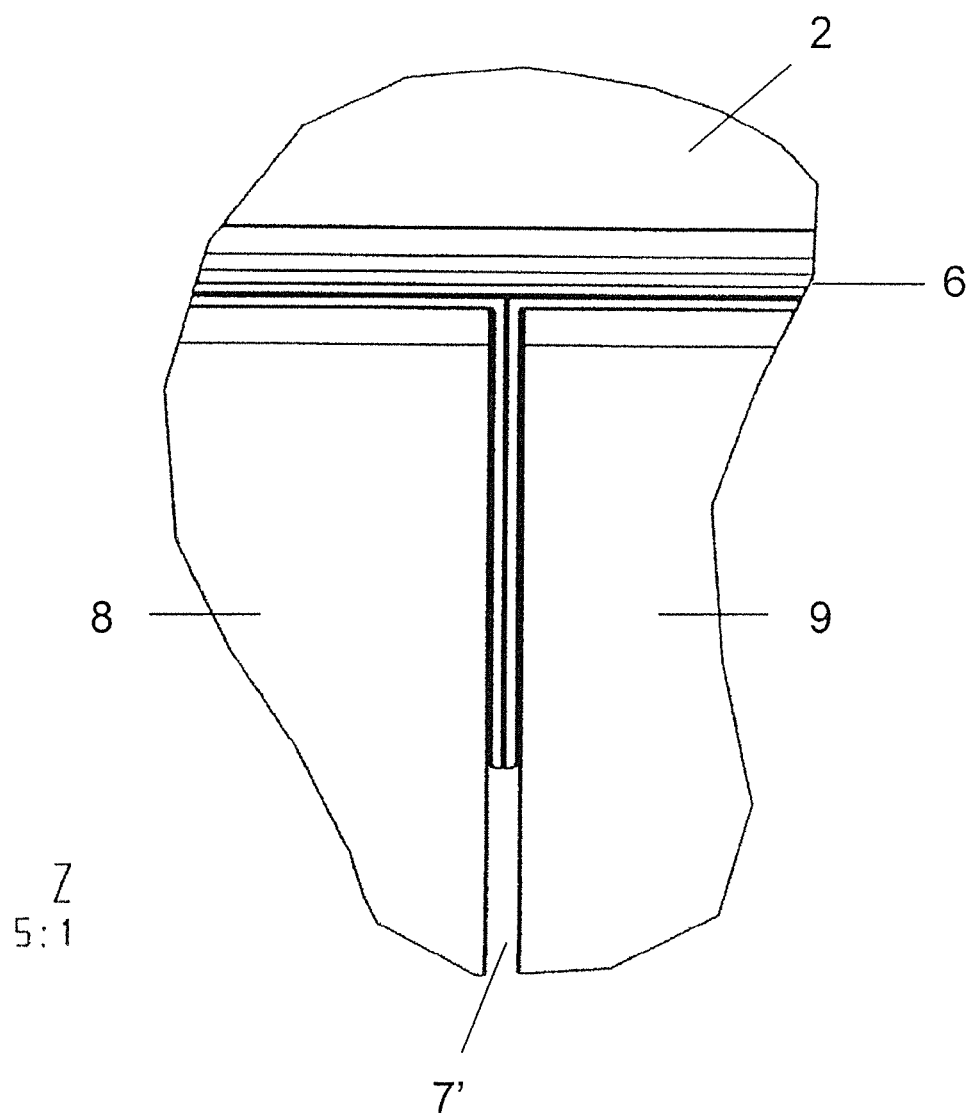
FIG. 7 shows an enlarged detail from FIG. 6.

FIGS. 5 to 7 show a second form of embodiment of the invention. FIG. 5 shows a perspective view of the second form of embodiment. Here again the sealing device exhibits a sonotrode 1 and a counter tool or anvil 2. However, here it is not the counter tool or anvil 2 that is made in two parts but the sonotrode 1 which consists of the two parts 8, 9. In this form of embodiment the already welded longitudinal sealing seam is then guided into the gap 7' formed between the two parts 8, 9 of the sonotrode 1. Otherwise this form of embodiment corresponds to the first form of embodiment.

Thus, according to the invention, either the sonotrode or the anvil is provided with a gap or divided in two so that a gap is formed between the two parts. Then the longitudinal sealing seam is guided through the gap perpendicularly to the welding face. This prevents the longitudinal sealing seam being welded again at the same time. Comprehensive tests have shown that with a gap width of approximately 0.1 to 0.2 mm the transverse sealing seam can be sealed without any leaks in spite of the gap.

The described method and the device can be used very flexibly. In addition the gap through which the longitudinal seam runs can also serve as an additional guide for the bag tube. A visually very neat seal is produced. The longitudinal seam is also not sealed to the transverse seam so that in certain circumstances it is available for other modification steps.

LIST OF REFERENCE NUMBERS

1 Sonotrode
2 Anvil
3 Part of the anvil
4 Part of the anvil
5 Longitudinal sealing seam
6 Tubular bag
7 Gap
7' Gap
8 Part of the sonotrode
9 Part of the sonotrode

The invention claimed is:

1. Method for producing a transverse sealing seam in a tubular bag exhibiting a longitudinal sealing seam (5) in which the tubular bag (6) is moved through between a sonotrode (1) and an anvil (2) and the sonotrode (1) and the anvil (2) are moved against one another to produce the transverse sealing seam so that a welding force is applied to the tubular bag (6), characterised in that at least during the application of the welding force the longitudinal sealing seam (5) is moved through a gap (7) formed in the sonotrode (1) or the anvil (2).

2. Method according to claim 1, characterised in that the gap (7) has a gap width of between 0.05 and 0.3 mm.

3. Method according to claim 1 or 2, characterised in that a two-part sonotrode (1) or a two-part anvil is used, in which the distance between the two parts of the sonotrode (1) or the anvil is adjusted according to the thickness of the longitudinal sealing seam ( 5 ).

4. Transverse sealing device with a sonotrode (1) and an anvil which are arranged in such a way that a strip of material to be processed can be moved through between the sonotrode (1) and the anvil, characterised in that the anvil exhibits a slot (7) having a width between 0.0 and 0.2 mm.

5. Transverse sealing device according to claim 4, characterised in that the anvil exhibits a plurality of slots of different widths.

6. Transverse sealing device according to claim 4 or 5, characterised in that the slot width is adjustable.

7. Transverse sealing device according to one of claims 4 to 5, characterised in that the anvil are formed in two parts, the slot (7) being formed between the two parts.

8. Transverse sealing device according to claim 7, characterised in that one part is moveable relative to the other part so that the slot width can be adjusted.

9. Transverse sealing device according to one of claims 4 to 5 characterised in that the depth of the slot (7) is greater than the width of the slot.

10. The method of claim 1, wherein the gap width is between 0.07 and 0.2 mm.

11. The method of claim 1 wherein the gap width is between 0.0 and 0.15 mm.

12. Method for producing a transverse sealing seam, the method comprising:
    a) providing a tubular bag (6) having a longitudinal sealing seam (5);
    b) providing a sonotrode (1) and an anvil (2), the sonotrode (1) or the anvil (2) having a gap (7) for receiving the longitudinal sealing seam (5);
    c) moving the tubular bag through between the sonotrode (1) and the anvil (2);
    d) moving the sonotrode (1) and the anvil (2) against one another;
    e) applying a welding force transversely to the tubular bag to form the transverse sealing seam in a strip of the tubular bag; and
    f) moving the longitudinal sealing seam (5) through the gap (7) formed in the sonotrode (1) or the anvil (2) during the application of the welding force.

13. Method according to claim 12, the longitudinal sealing seam extending generally perpendicularly to the strip of the tubular bag and in the gap (7) during application of the welding force.

14. Method according to claim 12, the sonotrode (1) or the anvil (2) being comprised of two parts, the distance between the two parts being adjustable, the longitudinal sealing seam (5) having a thickness, the method further comprising adjusting the distance between the two parts according to the thickness of the longitudinal sealing seam (5).

15. Transverse sealing device according to claim 4, the sonotrode having a sealing face, the anvil having a sealing surface, the slot extending generally perpendicularly to the sealing face of the sonotrode and the sealing face of the anvil.

16. Transverse sealing device with a sonotrode (1) and an anvil (2) which are arranged in such a way that a strip of material to be processed can be moved through between the sonotrode (1) and the anvil (2), characterised in that the sonotrode (1) exhibits a slot (7), wherein the slot width is adjustable between 0.0 and 0.2 mm.

17. Transverse sealing device according to claim 16, characterised in that the sonotrode is formed in two parts, the slot (7) being formed between the two parts.

18. Transverse sealing device according to claim 16, characterised in that one part is moveable relative to the other part so that the slot width can be adjusted.

19. Transverse sealing device according to one of claims 16 to 17 characterised in that the depth of the slot (7) is greater than the width of the slot (7).

20. Transverse sealing device according to claim 16, the sonotrode (1) having a sealing face, the anvil (2) having a sealing surface, the slot (7) extending generally perpendicularly to the sealing face of the sonotrode (1) and the sealing face of the anvil (2).

* * * * *